US006961946B2

(12) United States Patent  (10) Patent No.: US 6,961,946 B2
Wang  (45) Date of Patent: Nov. 1, 2005

(54) DISC DRIVE LOADING DEVICE

(75) Inventor: Kuo-Jen Wang, Jungli (TW)

(73) Assignee: BenQ Corporation, Taoyuan (TW)

( * ) Notice: Subject to any disclaimer, the term of this patent is extended or adjusted under 35 U.S.C. 154(b) by 217 days.

(21) Appl. No.: 10/463,924

(22) Filed: Jun. 18, 2003

(65) Prior Publication Data

US 2003/0235130 A1   Dec. 25, 2003

(30) Foreign Application Priority Data

Jun. 20, 2002 (TW) .............................. 91113461 A

(51) Int. Cl.[7] .......................................... G11B 17/022
(52) U.S. Cl. ..................................................... 720/604
(58) Field of Search ............................... 720/604, 640;
360/99.02, 99.06, 97.04, 98.08, 99.05, 99.12;
369/77.1; 348/231.7

(56) References Cited

U.S. PATENT DOCUMENTS 4,800,453 A * 1/1989 Okauchi et al. ......... 360/99.02
5,329,504 A    7/1994 Mukawa
5,485,329 A * 1/1996 Lee ........................... 360/99.06
5,504,730 A * 4/1996 Kanada ....................... 720/640
5,657,081 A * 8/1997 Kurahashi ................ 348/231.7
6,160,780 A * 12/2000 Furukawa et al. .......... 720/604
RE37,170 E  * 5/2001 Kurosu ....................... 369/77.1

FOREIGN PATENT DOCUMENTS

JP    9007265    1/1997

* cited by examiner

Primary Examiner—Tianjie Chen
(74) Attorney, Agent, or Firm—Snell & Wilmer L.L.P.

(57) ABSTRACT

A disc-loading device includes a loading arm, a holding device, a guiding rail, and a guiding slot. The loading arm has a first end and a second end. The first end is connected to and movable along the guiding rail. The second end has a roller inset into the guiding slot. Due to the guiding function of the guiding rail and the guiding slot, the loading arm is able to shift along the guiding rail or rotate around its axis. The holding device for holding the disc is provided on the loading arm by means of rotatory movement with respect to the loading arm.

10 Claims, 6 Drawing Sheets

DISC DRIVE LOADING DEVICE

CROSS REFERENCE TO RELATED APPLICATIONS

This Application claims priority to Taiwan Patent Application No. 091113461 filed on Jun. 20, 2002.

FIELD OF INVENTION

The present invention relates to an apparatus for loading a disc in a disc device and, more particularly, relates to an apparatus for loading a disc in a CD-ROM.

BACKGROUND OF THE INVENTION

With the progress of technology, portable discs with high data capacity have been broadly applied in people's daily life, which results in the frequent use of disc devices simultaneously.

To access the data on a disc with the prior art, the disc is required to be rested specifically on a designed place of a tray such as a disc depression, and is guided into a CD-ROM through the support of the tray. After the disc moves into the CD-ROM, a holding device and a turntable together clip the disc solidly so that the function of read or write the data can be executed by rotating the disc.

Nevertheless, when the disc is not placed on the proper location and is already led into the CD-ROM by the tray, the disc might get stuck inside the CD-ROM. If the stuck situation really occurs and the holding device and the turntable still compel the disc to rotate, the surface of the disc is likely to be scraped under the rotation with the result that the disc is damaged too seriously to ever access the data on it.

In addition, in order to meet the particular requirements of the system assembly, CD-ROMs might need to be installed into the computer erectly. However, such installation method also increases the probability of unstable disc-holding capability or unsuccessful disc placement during accessing data on the disc.

SUMMARY OF THE INVENTION

An aspect of the present invention is to provide an apparatus for loading a disc, which is capable of holding a disc firmly no matter what angle the apparatus is arranged in a system.

A further aspect of the present invention is to provide an apparatus for loading a disc, which has the advantages of having a simple mechanism and low costs.

The disc loading apparatus of a CD-ROM of the present invention includes a loading arm, a holding device, a guiding rail, and a guiding slot. The loading arm has a first end for sleeving the guiding rail, a second end with a round pulley to be movably received in the guiding slot, and a third end. Being led by the guiding rail and the guiding slot, the loading arm is able to move back and forth along the guiding rail. Moreover, the holding device for holding a disc is attached to the third end by means of rotatory movement.

The CD-ROM further includes a driving device configured to drive the guiding rail for spinning and, therefore, the loading arm can move along the guiding rail. The holding device further includes a holding paw for grasping a disc tightly and an alignment column for positioning the holding device on a turntable. With the driving power of a turn device, the turntable can lead the disc to spin. The loading arm further includes a foldable unit that can be folded upwardly in order to facilitate the operations of disc load and unload as the loading arm has moved out of the CD-ROM.

The advantages and spirits of the present invention can be completely realized by referring to the following detailed description and the attached drawings.

DETAILED DESCRIPTION

The present invention discloses an apparatus for holding and moving a disc in a CD-ROM.

Figure 1A:
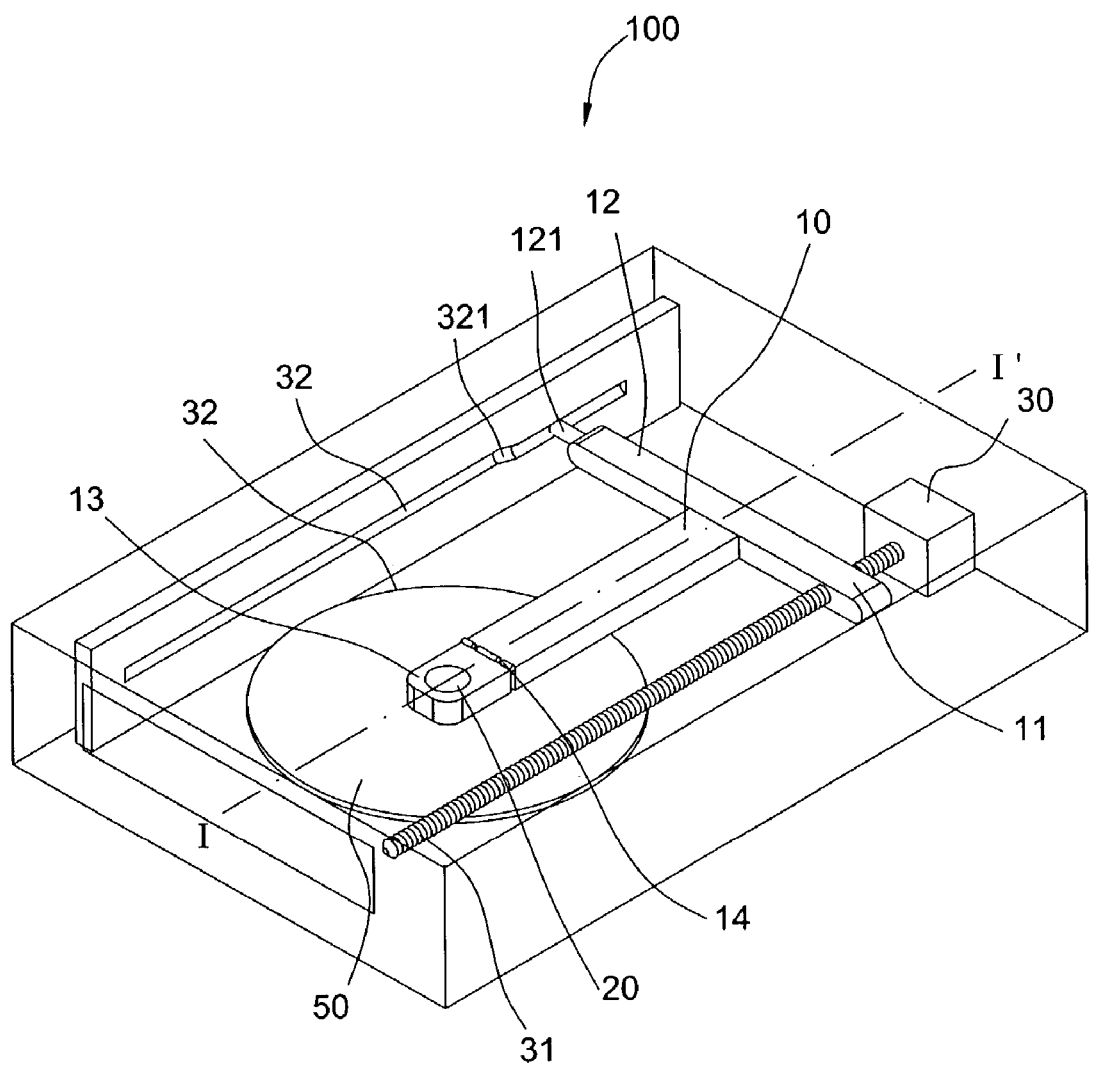
FIG. 1a is a schematic diagram illustrating the first embodiment of the present invention.

With reference to FIG. 1a illustrating a first embodiment of the present invention, a CD-ROM 100 includes a loading arm 10, a holding device 20, a guiding rail 31, and a guiding slot 32. The loading arm 10 has a first end 11, a second end 12, and a third end 13. The first end 11 sleeves the guiding rail 31, and the second end 12 has a round pulley 121 configured to movably embed in the guiding slot 32. With the guidance of the guiding rail 31 and guiding slot 32, the loading arm 10 is capable of moving along the guiding rail 31 and the guiding slot 32. Besides, the holding device 20 is connected to the third end 13 by means of rotatory movement to hold a disc 50. Therefore, the disc 50 can spin while being held by the holding device 20 and also can move back and forth while being carried by the loading arm 10.

The CD-ROM 100 further includes a driving device 30. If the guiding rail 31 is made of a lead screw, the driving device 30 can direct the guiding rail 31 to spin so that the loading arm 10 is forced to move forwards or backwards with respect to the guiding rail 31.

Figure 1B:
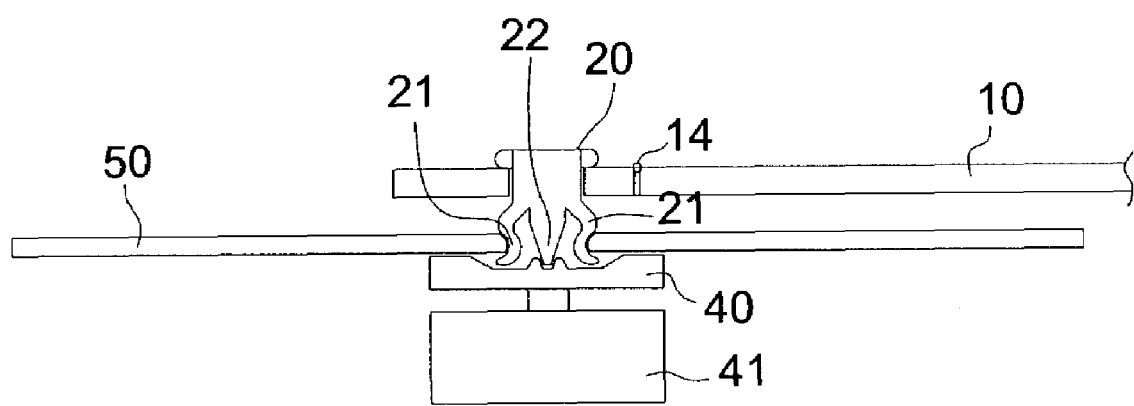
FIG. 1b illustrates the sectional view of FIG. 1a with respect to the line I–I'.

FIG. 1b is the sectional view of FIG. 1a with respect to the line I–I'. Referring to FIG. 1b, the holding device 20 includes a holding paw 21 and an alignment column 22. The holding paw 21 is configured to grasp the disc 50 tightly, whereas the alignment column 22 is configured to position the holding device 20 on a turntable 40. The turntable 40 can further activate the disc 50 to spin because a turn device 41 can drive the turntable 40. It is preferred that the materials of the alignment column 22 and the turntable 40 are chosen from magnetic substances such as magnet and iron, so that the holding device 20 can be solidly positioned on the turntable 40 by magnetic force.

It is noted that the turntable 40 and the turn device 41 of the first embodiment of the present invention are fixed in the CD-ROM 100. Hence, to avoid unexpected collision, the holding device 20 needs ascending and detaching from the turntable 40 before the disc 50 is ejecting from the CD-ROM 100. To facilitate the ascending, the guiding slot 32 is designed to have a curved structure 321 as shown in FIG. 1a. When the round pulley 121 moves along the curved structure 321, the second end 12 of the loading arm 10 will be ascending gradually relative to a bass line. In this manner, the altitude of the holding device 20 can be changed. Consequently, no unexpected collision will occur during the ejection.

Figure 1C:
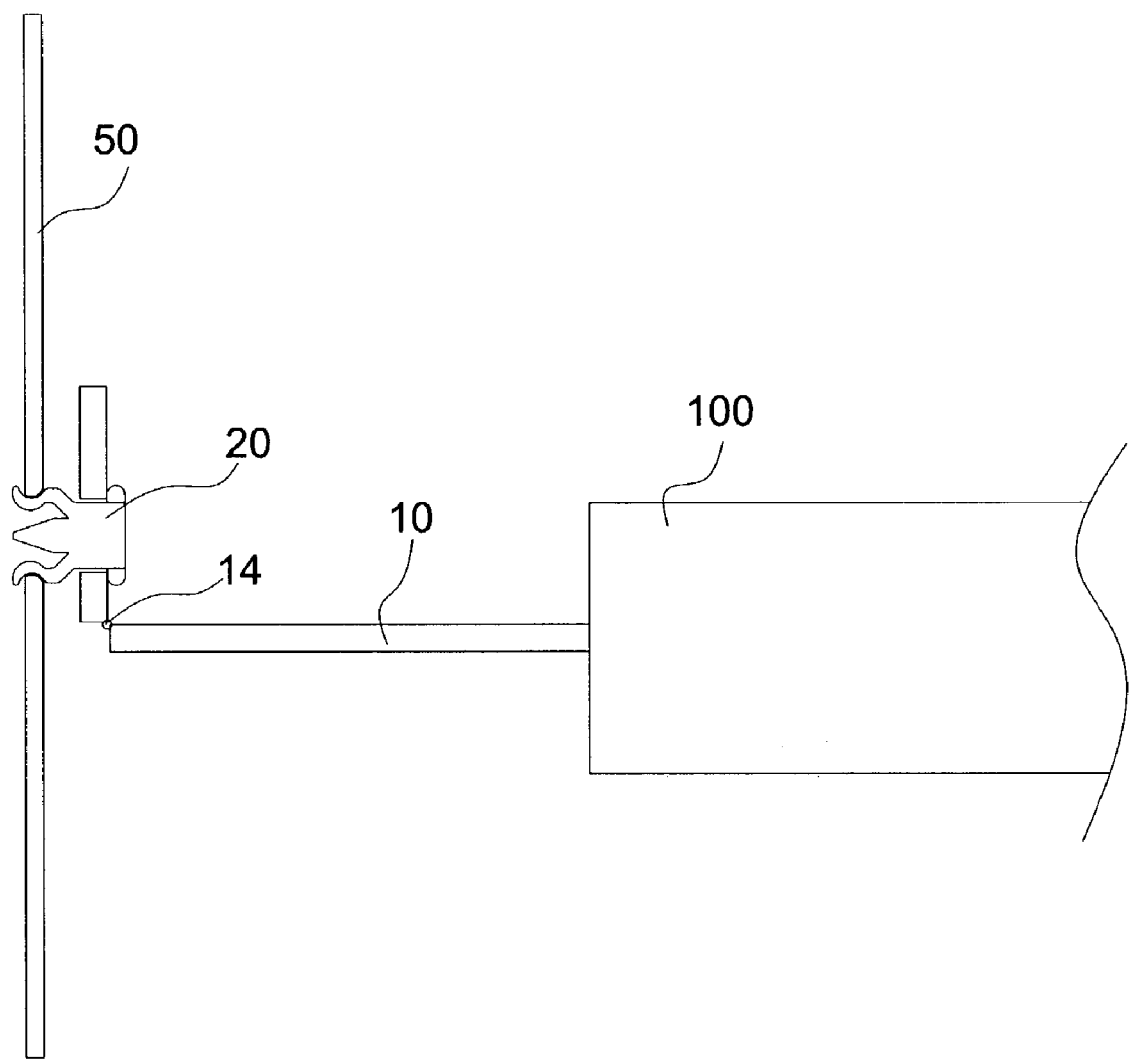
FIG. 1c illustrates the folded loading arm.

To facilitate loading and unloading of the disc 50, the loading arm 10 further includes a foldable unit 14 being able to fold upwardly after the loading arm 10 has been moved out of the CD-ROM 100 so that the holding device 20 can be at an angle that is convenient for the user to load and unload the disc 50, as shown in FIG. 1c.

Figure 2A:
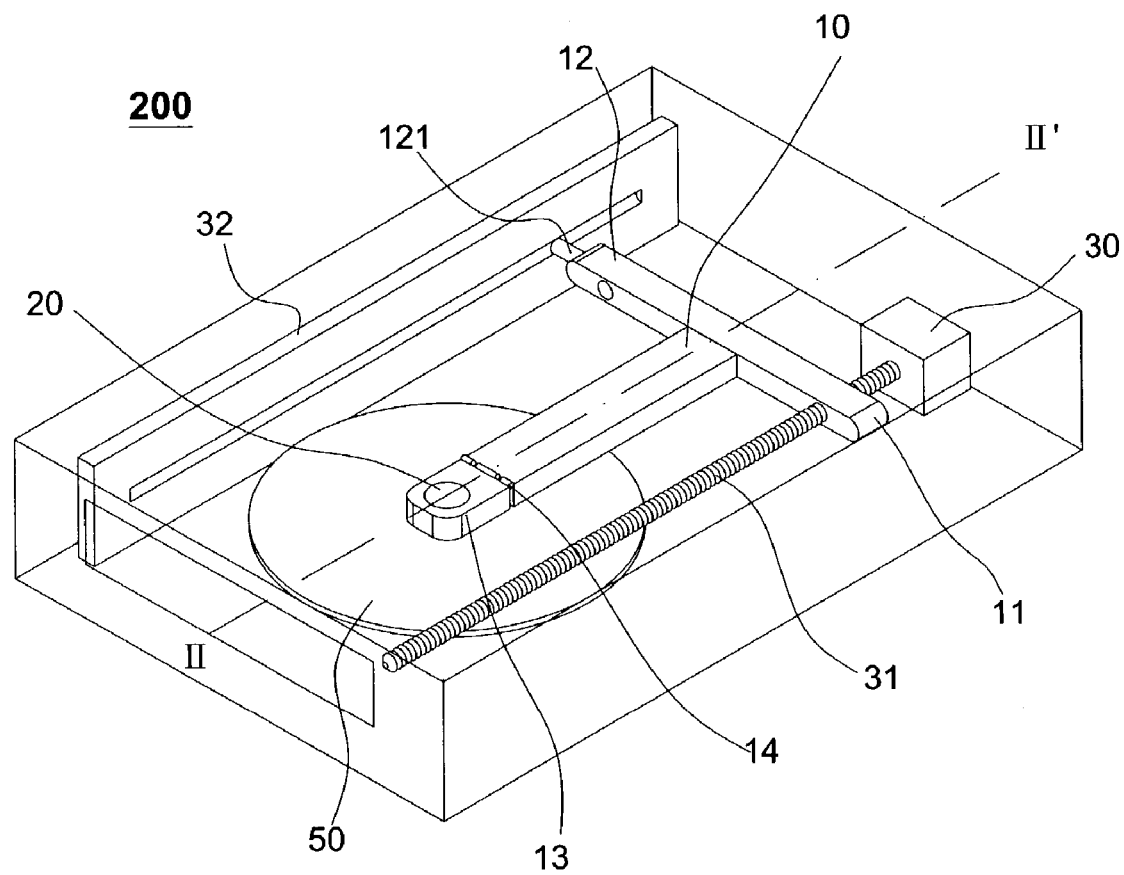
FIG. 2a illustrates the second embodiment of the present invention.
Figure 2B:
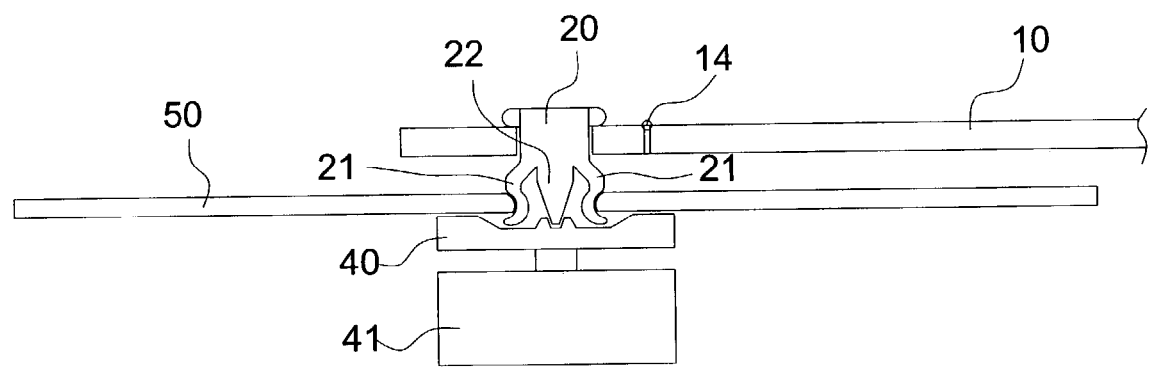
FIG. 2b illustrates the sectional view of FIG. 2a with respect to the line II–II'.

FIG. 2a and FIG. 2b respectively illustrate a second embodiment of the present invention and its sectional view with respect to the line II–II'. As shown in FIG. 2a and FIG. 2b, the CD-ROM 200 of the second embodiment includes a loading arm 10, a holding device 20, a guiding rail 31, a guiding slot 32, a driving device 30, a turntable 40, and a turn device 41.

The loading arm 10 includes a first end 11, a second end 12, and a third end 13, wherein the first end 11 sleeves the guiding rail 31 and the second end 12 has a round pulley 121 configured to movably embed in the guiding slot 32. With the guidance of the guiding rail 31 and guiding slot 32, the loading arm 10 is capable of moving back and forth along the guiding rail 31 and the guiding slot 32. The holding device 20 is connected to the third end 13 for holding a disc 50 by means of rotatory movement. Therefore, the disc 50 can spin while being held by the holding device 20 and can move while being carried by the loading arm 10. If the guiding rail 31 is made of a lead screw, the driving device 30 can direct the guiding rail 31 to spin so that the loading arm 10 is forced to move forwards or backwards with respect to the guiding rail 31.

The holding device 20 further includes a holding paw 21 and an alignment column 22. The holding paw 21 is configured to grasp the disc 50 tightly and the alignment column 22 is configured to position the holding device 20 on a turntable 40. The turntable 40 can further activate the disc 50 to rotate because a turn device 41 can drive the turntable 40. As mentioned above, the materials of the locating column 22 and the turntable 40 are preferred to be chosen from magnetic substances, such as magnet and iron, so that the holding device 20 can be solidly positioned on the turntable 40. Similarly, the loading arm 10 also has a foldable unit 14 to fold the holding device 20 up to facilitate loading and unloading of the disc 50.

Figure 2C:
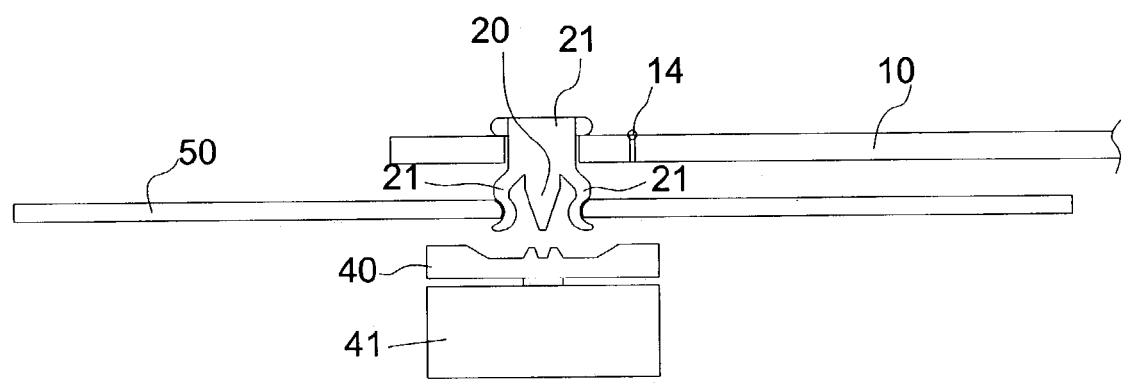
FIG. 2c illustrates the descending turntable.

It is noted that the difference between the first embodiment and the second embodiment of the present invention is that the turn device 41 of the second embodiment is capable of controlling the turntable 40 upwards and downwards. When the loading arm 10 is going to eject from the CD-ROM 200, as shown in FIG. 2c, the turntable 40 is forced to shift downwards first in order to separate from the holding device 20. The disc 50 will not collide with the turntable 40 during the movement of the loading arm 10. Therefore, the guiding slot 32 does not have to include a curved structure 321 of the first embodiment because the second end 12 of the loading arm 10 need not shift upwards during the movement of the loading arm 10.

The above description of the preferred embodiments is expected to clearly expound the characteristics of the present invention but not expected to restrict the scope of the present invention. Those skilled in the art will readily observe that numerous modifications and alterations of the apparatus may be made while retaining the teaching of the invention. Accordingly, the above disclosure should be construed as limited only by the bounds of the claims.

I claim:

1. A disc device comprising:
   a holding device configured to hold a disc;
   a loading arm, the loading arm being movably disposed in the disc device and the holding device rotatably connected to the loading arm so that the disc is able to spin while being held by the holding device, the loading arm supporting and selectively moving the holding device out of and into the disc device;
   a turntable having a second holding device configured to hold the first holding device so that the first holding device is able to spin on the turntable;
   a guiding rail, the loading arm sleeving the guiding rail; and
   a guiding slot configured to receive the loading arm;
   wherein, when the loading arm moves out from the disc drive along the guiding rail and the guiding slot, the first holding device and the second holding device separate from each other, and, when the loading arm moves into the disc drive along the guiding rail and the guiding slot, the second holding device holds the first holding device.

2. The disc device of claim 1, further comprising a driving device for driving the guiding rail to spin so that the loading arm is capable of moving along the guiding rail and the guiding slot.

3. The disc device of claim 1, wherein the loading arm further comprises a foldable unit allowing the loading arm to fold.

4. The disc device of claim 1, wherein the guiding rail comprises a lead screw.

5. The disc device of claim 1, wherein the guiding slot defines a curved structure, and as the loading arm moves along the curved structure, the loading arm changes an altitude relative to a bass line.

6. A disc drive for accessing data on a disc, comprising:
   a first holding device configured to hold the disc;
   a loading arm, the first holding device being rotatably connected to the loading arm so that the disc is able to spin while being held by the first holding device, the loading arm being configured to support and move the first holding device and comprising a first end and a second end;
   a lead screw configured to direct the first end to move, the first end sleeving the lead screw;
   a guiding slot, configured to receive the second end, for guiding the second end to move, the guiding slot defining a curved structure and as the second end moves along the curved structure, the second end changing an altitude relative to a bass line; and
   a turntable comprising a second holding device configured to hold the first holding device so that the first holding device is able to spin on the turntable;
   wherein, when the loading arm ascends during movement, the first holding device and the second holding device separate from each other, and, when the loading arm descends during movement, the second holding device holds the first holding device.

7. The disc drive of claim 6, wherein the loading arm further comprises a foldable unit allowing the loading arm to fold.

8. A disc drive for accessing data on a disc, comprising:
   a first holding device configured to hold the disc;
   a loading arm, the first holding device being rotatably connected to the loading arm so that the disc is able to spin while being held by the first holding device, the loading arm being configured to support and move the first holding device and comprising a first end and a second end;
a lead screw configured to direct the first end to move, the first end sleeving the lead screw;
a guiding slot, configured to receive the second end, for guiding the second end to move; and
a turntable comprising a second holding device configured to hold the first holding device so that the first holding device is able to spin on the turntable;
wherein, when the loading arm moves out from the first holding device, the turn table descends so that the first holding device and the second holding device separate from each other, and, when the loading arm moves into the disc drive, the turn table ascends so that the second holding device holds the first holding device.

9. The disc drive claim 8, wherein the loading arm further comprises a foldable unit, and the foldable unit comprises the first holding device allowing the loading arm to fold.

10. A disc device for loading a disc, comprising:
a holding device configured to hold the disc;
a loading arm, the loading arm being movably disposed in the disc device and the holding device rotatably connected to the loading arm so that the disc is able to spin while being held by the holding device, the loading arm supporting and selectively moving the holding device out of and into the disc device, the loading arm including a foldable unit allowing the loading arm to fold; and
a turntable having a second holding device configured to hold the first holding device so that the first holding device is able to spin on the turntable;
wherein, when the loading arm moves out from the disc drive, the first holding device and the second holding device separate from each other, and, when the loading arm moves into the disc drive, the second holding device holds the first holding device.

* * * * *